United States Patent
Hong et al.

(10) Patent No.: US 10,305,932 B2
(45) Date of Patent: May 28, 2019

(54) SYSTEM AND METHOD FOR DETECTING FALSE DATA INJECTION IN ELECTRICAL SUBSTATIONS

(71) Applicant: ABB Inc., Raleigh, NC (US)

(72) Inventors: Junho Hong, Cary, NC (US); Reynaldo Nuqui, Cary, NC (US)

(73) Assignee: ABB Inc., Raleigh, NC (US)

( * ) Notice: Subject to any disclaimer, the term of this patent is extended or adjusted under 35 U.S.C. 154(b) by 261 days.

(21) Appl. No.: 15/386,339

(22) Filed: Dec. 21, 2016

(65) Prior Publication Data

US 2018/0176249 A1 Jun. 21, 2018

(51) Int. Cl.
*G01R 25/00* (2006.01)
*G01R 35/00* (2006.01)
(Continued)

(52) U.S. Cl.
CPC .......... *H04L 63/1466* (2013.01); *G01R 25/00* (2013.01); *G01R 35/005* (2013.01);
(Continued)

(58) Field of Classification Search
CPC . H04L 63/1466; H04L 63/1416; G01R 25/00; G01R 35/005; G05B 19/00
(Continued)

(56) References Cited

U.S. PATENT DOCUMENTS 8,405,944 B2 * 3/2013 Donolo ................. H02H 7/261
361/36
2001/0021896 A1 9/2001 Bertsch
(Continued)

FOREIGN PATENT DOCUMENTS

WO 2016066218 A1 5/2016

OTHER PUBLICATIONS

Abur, Ali, Role of Synchronized Measurement in Operation of Smart Grids, ; Northeastern University; Boston, Massachusetts; CISE Seminar, Nov. 12, 2010, pp. 1-64.
(Continued)

*Primary Examiner* — Michael Pyzocha
*Assistant Examiner* — Zoha Piyadehghibi Tafaghodi
(74) *Attorney, Agent, or Firm* — Taft Stettinius & Hollister LLP; J. Bruce Schelkopf (57) ABSTRACT

Unique systems, methods, techniques and apparatuses of a substation phasor data concentrator (ssPDC) is disclosed herein. One exemplary embodiment is a method for operating an electrical substation including a merging unit (MU), a phasor measurement unit (PMU), and a substation phasor data concentrator (ssPDC). The method includes receiving, with the MU and the PMU, input information corresponding to a set of electrical characteristics of the electrical substation; measuring, with the MU, the input information; measuring, with the PMU, the input information; a and estimating, with the ssPDC, electrical characteristics of the electrical substation using the received false measurement and the one of the MU measurement and the PMU measurement, determining in substantially real time the false measurement does not correspond to the set of electrical characteristics using the estimated electric characteristics, and replacing the false measurement with the received the one of the MU measurement and the PMU measurement.

20 Claims, 3 Drawing Sheets

(51) Int. Cl.
*G05B 23/02* (2006.01)
*G06F 21/55* (2013.01)
*G06F 21/57* (2013.01)
*H04L 29/06* (2006.01)

(52) U.S. Cl.
CPC ......... *G05B 23/0286* (2013.01); *G06F 21/55* (2013.01); *G06F 21/577* (2013.01); *H04L 63/1416* (2013.01)

(58) Field of Classification Search
USPC .......................................................... 726/23
See application file for complete search history.

(56) References Cited

U.S. PATENT DOCUMENTS

| 2011/0288692 | A1* | 11/2011 | Scott | ....................... G06F 21/55 700/297 |
| 2013/0304266 | A1 | 11/2013 | Giannakis et al. | |
| 2014/0074415 | A1 | 3/2014 | Rudolph | |
| 2016/0315774 | A1 | 10/2016 | Faruque et al. | |

OTHER PUBLICATIONS

Meliopoulos A.P. Sakis, "Distributed Dynamic State Estimator Enables Seamless DSA", ; Georgia Power Distinguished Professor School of Electrical and Computer Engineering; 2014, Georgia Institute of Technology; Altanta GA USA, Jul. 27, 2014, pp. 1-5.
Search Report and Written Opinion, PCT Appln. No. PCT/US17/67950, dated Feb. 20, 2018, 14 pgs.

* cited by examiner

SYSTEM AND METHOD FOR DETECTING FALSE DATA INJECTION IN ELECTRICAL SUBSTATIONS

STATEMENT REGARDING FEDERALLY SPONSORED RESEARCH OR DEVELOPMENT

This invention was made with U.S. Government support under Contract No. DE-OE0000674 awarded by the Department of Energy. The Government has certain rights in this invention.

BACKGROUND

The present disclosure relates generally to false data detection in electrical substations using a local substation phasor data concentrator (ssPDC). Measurement data collected within a substation is transmitted to a local ssPDC before being transmitted to a centralized data processor, such as a supervisory control and data acquisition system (SCADA) or a control center level phasor data concentrator system. The measurement data is transmitted by way of wireless and wired communication channels. A cyber intruder, injecting false data into a wireless or wired communication channel of an electrical substation, could disrupt the operation of the centralized data processor, driving the utility grid into an emergency operating state. Existing false data detection systems suffer from a number of shortcomings and disadvantages. There remain unmet needs including reduced substation downtime following a cyberattack. For instance, an electrical substation may respond to a cyberattack detection by ceasing operating until a technician determines the extent of the cyberattack. There is a significant need for the unique apparatuses, methods, systems and techniques disclosed herein.

DISCLOSURE OF ILLUSTRATIVE EMBODIMENTS

For the purposes of clearly, concisely and exactly describing non-limiting exemplary embodiments of the disclosure, the manner and process of making and using the same, and to enable the practice, making and use of the same, reference will now be made to certain exemplary embodiments, including those illustrated in the figures, and specific language will be used to describe the same. It shall nevertheless be understood that no limitation of the scope of the present disclosure is thereby created, and that the present disclosure includes and protects such alterations, modifications, and further applications of the exemplary embodiments as would occur to one skilled in the art with the benefit of the present disclosure.

SUMMARY

Exemplary embodiments include unique systems, methods, techniques and apparatuses for detecting and removing false data in electrical substation data collection systems. Further embodiments, forms, objects, features, advantages, aspects and benefits of the disclosure shall become apparent from the following description and drawings.

DETAILED DESCRIPTION OF ILLUSTRATIVE EMBODIMENTS

Figure 1:
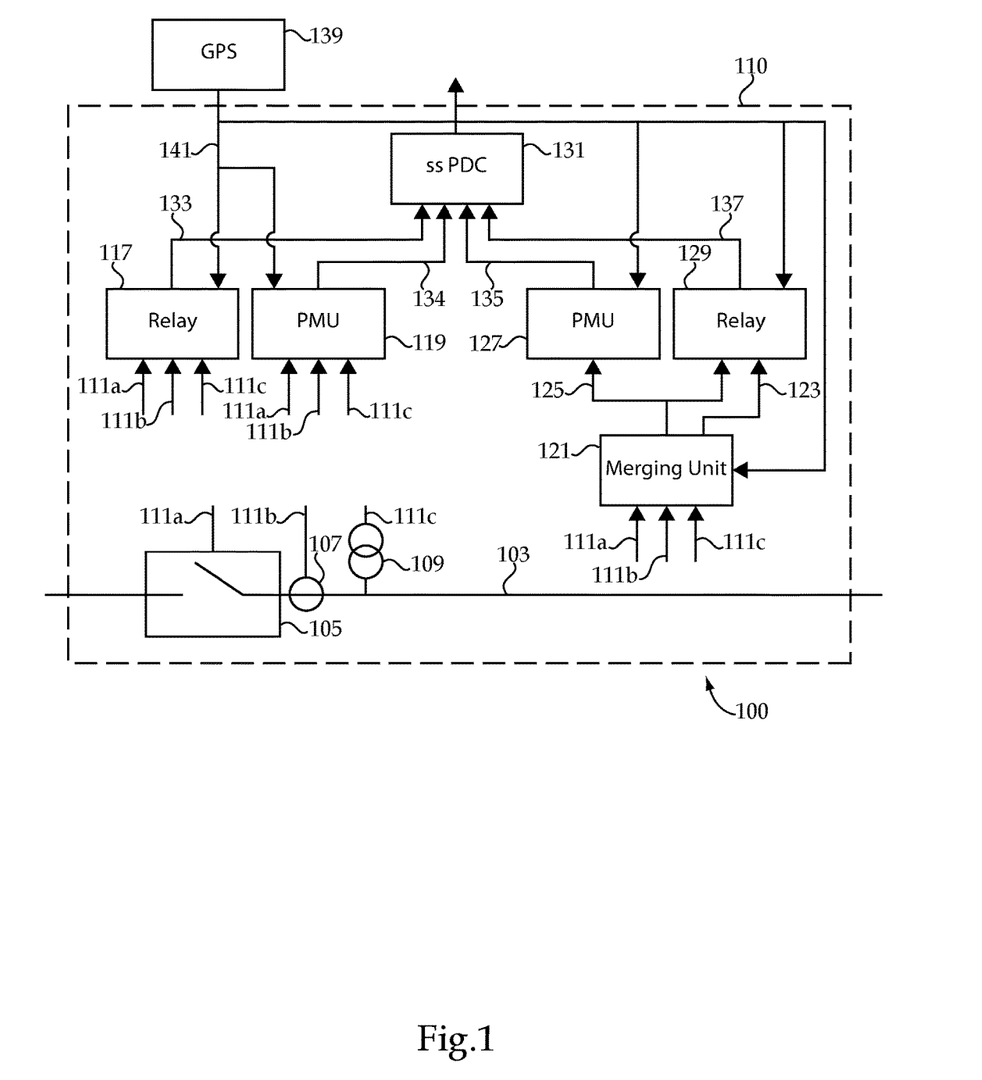
FIGS. 1 and 2 illustrate exemplary electrical substation data collection systems.

With reference to FIG. 1 there is illustrated an exemplary electrical substation data collection system 100 including an electrical substation 110 operatively coupled to a utility grid. It shall be appreciated that substation 110 may be a transmission substation, a distribution substation, a converter substation, and collection substation, or a switching substation, to name but a few examples.

Substation 110 includes a substation phasor data concentrator (ssPDC) 131 structured to receive data from other devices of substation 110 by way of wireless or wired communication channels, verify the accuracy of the received data, eliminate and replace inaccurate data, and transmit accurate data to another device, such as a supervisory control and data acquisition system (SCADA) or a central phasor data concentrator structured to receive data from a plurality of electrical substations.

In the illustrated embodiment, substation 110 includes an electrical power line 103 structured to transmit electric power having electrical characteristics including voltage and current. Substation 110 may also include additional electrical power lines such that substation 110 receives and transmits multiphase power, each power line having distinct electrical characteristics.

Substation 110 includes a circuit breaker 105, a current transformer 107, and a voltage transformer, each operatively coupled to power line 103. Where substation 110 is structured to receive and transmit multiphase power, a circuit breaker, current transformer, and a voltage transformer may be operatively coupled to each additional power line.

Circuit breaker 105 is structured to selectively disrupt the flow of electrical current in line 103 in response to detecting a fault condition. When circuit breaker 105 is closed, electrical current can flow through power line 103. When circuit breaker 105 is open, electrical current cannot flow through power line 103. Circuit breaker 105 is configured to output the open/closed status of breaker 105.

Current transformer 107 is structured to receive power from line 103, step down the current of the received power, and output the power with the stepped down current. For example, the output of current transformer 107 may be power with a current within a range of 0 A to 5 A.

Voltage transformer 109 is structured to receive power from line 103, step down the voltage of the received power, and output the power with the stepped down voltage. For example, the output of voltage transformer 109 may be power with a voltage within a range of 0 V to 120 V.

Substation 110 includes a plurality of devices structured to receive a set of information 111 from circuit breaker 105, current transformer 107, and voltage transformer 109. Information 111 includes data corresponding to electrical characteristics of the power received and transmitted with line 103, such as current, voltage, and circuit breaker status. In the illustrated embodiment, information 111a is data related to circuit breaker status, information 111b is current transformer output, and information 111c is voltage transformer output.

In the illustrated embodiment, substation 110 includes protective relay 117, a phasor measurement unit (PMU) 119, and a merging unit 121, each coupled to and structured to receive information 111 from circuit breaker 105, current transformer 107, and voltage transformer 109. In other embodiments, substation 110 includes additional or fewer devices structured to receive information 111 or portion of information 111.

System 100 includes an external synchronization unit 139 configured to communicate with substation 110 by way of a time synchronization communication channel 141. Unit 139 is structured to transmit synchronization data using channel 141. In the illustrated embodiment, unit 139 is a global positioning system. In certain embodiments, unit 139 is configured to operate according to Inter Range Instrumentation Group (IRIG) time code formats, such as one pulse per second (1PPS), or the IEEE 1588 protocol.

Using information 111, relay 117 is configured to determine whether a fault condition exists, requiring relay 117 to open in order to protect devices of substation 110. Relay operational data, such as the open/close status of relay 117, may be transmitted to ssPDC 131 by way of a relay communication channel 133. In order to synchronize the relay operational data transmitted to ssPDC 131, relay 117 receives synchronization data from synchronization unit 139. Relay 117 may transmit relay operational data using a standardized communication protocol, such as Distributed Network Protocol (DNP) or Manufacturing Message Specification (MMS). It shall be appreciated that any or all of the foregoing features of relay 117 may also be present in the other relays disclosed herein.

PMU 119 is structured to receive information 111 and generate phasor data using information 111. The phasor data represents electrical characteristics of power line 103 as phasors at a time instant. For example, phasor data may include a vector representation of voltage and current at a fundamental frequency, such as 50 Hz or 60 Hz. In order to synchronize the phasor data transmitted to ssPDC 131, PMU 119 receives synchronization data from synchronization unit 139. PMU 119 transmits the synchronized phasor data to ssPDC 131 by way of a PMU communication channel 134 using a communication protocol, such as C37.118. It shall be appreciated that any or all of the foregoing features of PMU 119 may also be present in the other PMUs disclosed herein.

PMU 119 may be one of several types of electrical substation devices that are structured to measure voltages and currents of a power grid and output time-stamped voltage and current phasors. In various forms, PMU 119 can be structured as a dedicated device or can be incorporated into a protective relay or other substation device. In certain forms, PMU 119 may be operatively coupled to receive input from a current transformer and to provide a current phasor as an output based upon the received input and/or operatively coupled to receive input from a voltage transformer and to provide a voltage phasor as an output based upon the received input. The PMU may also output phasors in phase quantities and sequence quantities. In sequence quantities, positive sequence voltage and/or current phasors are calculated using the phase voltage and current phase quantities, respectively. The PMU may also output the frequency and rate of change of frequency. Connections between the PMU 119 and the voltage transformer and/or current transformer may correspond to the number of current phases or voltage phases being measured, for example, a three-phase voltage or a three-phase current may utilize three separate electrical connections to a voltage transformer or a current transformer, respectively.

Merging unit 121 is structured to receive information 111, generate merging unit data using information 111, and output merging unit data. Merging unit data may be generated by sampling the real-time outputs of voltage transformer 109 and current transformer 107, receiving time synchronization data from synchronization unit 139, and combining the synchronization data and the sampled values, also known as sampled measured values or IEC 61850-9-2 values, into a data set. The merging unit data may be mapped to a sampled value (SV) protocol such as IEC 61850-9-2. In the illustrated embodiment, merging unit 121 transmits SV data to PMU 127 and relay 129 by way of merging unit communication channel 125. Merging unit data may also be generated by mapping received circuit breaker status information to IEC 61850-8-1 Generic Object Oriented Substation Event (GOOSE) protocol. In the illustrated embodiment, merging unit 121 transmits GOOSE data to relay 129. In certain embodiments, merging unit 121 uses the merging unit data set to generate synchrophasor data and transmits the synchrophasor data to ssPDC 131 using IEC 61850-5 communication protocol.

Merging unit 121 may be one of several types of electrical substation devices that are structured to measure voltages and currents within an electrical substation and output time-stamped voltage and current measurements, such as phasors or sampled values. Merging unit may send sampled values to multiple devices, including relays and PMUs. In certain embodiments, relays and PMUs may receive sampled values from merging unit 121 instead of receiving a signal from current transformer 107 and voltage transformer 109. In various forms, merging unit 121 can be structured as a dedicated device or can be incorporated into an intelligent electronic device or another substation device. In certain forms, merging unit 121 may be operatively coupled to receive input from a current transformer and to provide a sampled current value as an output based upon the received input and/or operatively coupled to receive input from a voltage transformer and to provide a sampled voltage value as an output based upon the received input. Connections between the merging unit 121 and the voltage transformer and/or current transformer may correspond to the number of current phases or voltage phases being measured, for example, a three-phase voltage or a three-phase current may utilized three separate electrical connections to three voltage transformers or three current transformers, respectively. Merging unit 121 may transmit synchophasors directly to ssPDC 131 or may transmit sampled values to other devices in the electrical substation for processing. Merging unit 121 can receive the GOOSE trip signal, such as a circuit breaker open/close command message from a relay, and then send the open/close trip signal to an operatively coupled circuit breaker.

PMU 127 is structured to receive SV data from merging unit 121, receive time synchronization data from synchronization unit 139, calculate phasor data using the SV data and time synchronization data, and output the phasor data to ssPDC 131 by way of communication channel 135. Relay 129 is structured to receive the SV data and GOOSE data from merging unit 121 and output relay measurements and operational data to ssPDC 131.

Using the data received from the relays, merging unit, and PMUs of substation 110, ssPDC 131 is configured to detect false data received by ssPDC 131 using local state estimation. For example, false data may be injected by a cyber intruder. As explained in more detail below, when ssPDC 131 detects false data regarding a circuit breaker status, the false data is removed and replaced with calculated circuit breaker status data. When ssPDC 131 detects false phasor data, ssPDC 131 eliminates the false data and replaces the eliminated false data with data from an uncorrupted data source. For example, if ssPDC 131 receives false phasor data from communication channel 135, the phasor data derived from the SV data is compromised, and ssPDC 131 replaces the false phasor data using PMU data. ssPDC 131 may also transmit an alarm indicating false data has been detected. The alarm may include a message transmitted to an external device such as a SCADA system. Furthermore, a blocking command may be sent to a local circuit breaker configured to control the circuit breaker so as to ignore trip commands until a technician addresses the cyberattack.

ssPDC 131 may be one of several types of electrical substation devices that are structured to collect local substation measurements and transmit the collected measurements to an external device, such as a system operator, a SCADA system, a regional coordinating council, or a centralized data concentrator. In various forms, ssPDC 131 can be structured as a dedicated device or can be incorporated into an intelligent electronic device or other substation device. In certain forms, ssPDC 131 includes a server structured to store historical phasor measurements. Before transmitting the collected substation measurements to another device, such as a centralized phasor data concentrator, ssPDC 131 may evaluate the measurements for accuracy.

While the embodiments described hereinafter may not specifically describe features analogous to the features of system 100, such features may nonetheless be employed in connection with the described systems.

Figure 2:
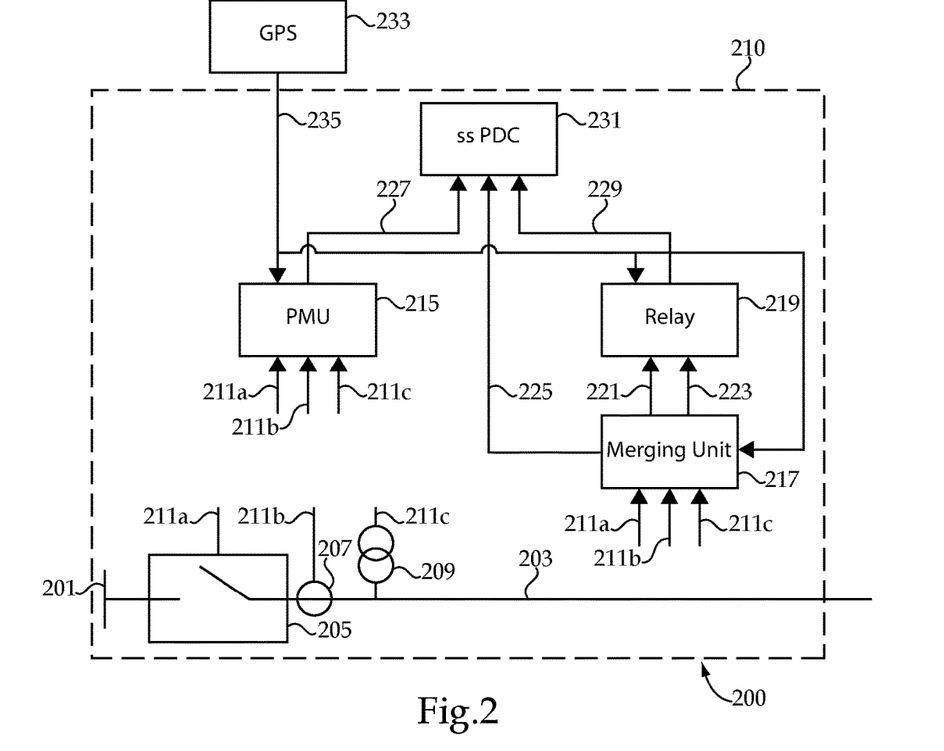

With reference to FIG. 2 there is illustrated an exemplary electrical substation data collection system 200 including an electrical substation 210. Substation 210 includes an electric power line 203 coupled to a bus bar 201. Substation 210 further includes a circuit breaker 205, and current transformer 207, and a voltage transformer 209, each operatively coupled to power line 203.

Substation 210 includes a PMU 215, a merging unit 217, a relay 219, and an ssPDC 231. System 200 includes a synchronization unit 233 configured to transmit synchronization data to PMU 215, relay 219, and merging unit 217 by way of a time synchronization communication channel 235.

A set of information 211 including circuit breaker 205 status, and outputs from current transformer 207 and voltage transformer 209 are transmitted to PMU 215 and merging unit 217. PMU 215 is configured to generate synchronized phasor data and circuit breaker status data using information 211, and output the generated data to ssPDC 231 by way of PMU communication channel 227.

Merging unit 217 is configured to output SV and GOOSE data to relay 219 using merging unit communication channels 221 and 223, respectively. Merging unit 217 is also configured to generate synchrophasor data using information 211 and output synchrophasor data to ssPDC 231 by way of communication channel 225 using communication protocol IEC 61850-90-5.

Relay 219 is configured to receive SV and GOOSE data from merging unit 217. Using the received data, relay 219 determines whether a fault condition is occurring within substation 210, and transmits operation data to ssPDC 231 by way of communication channel 229. It shall be appreciated that any or all of the foregoing features of system 200 may also be present in the other electrical substation data collection systems disclosed herein.

Figure 3:
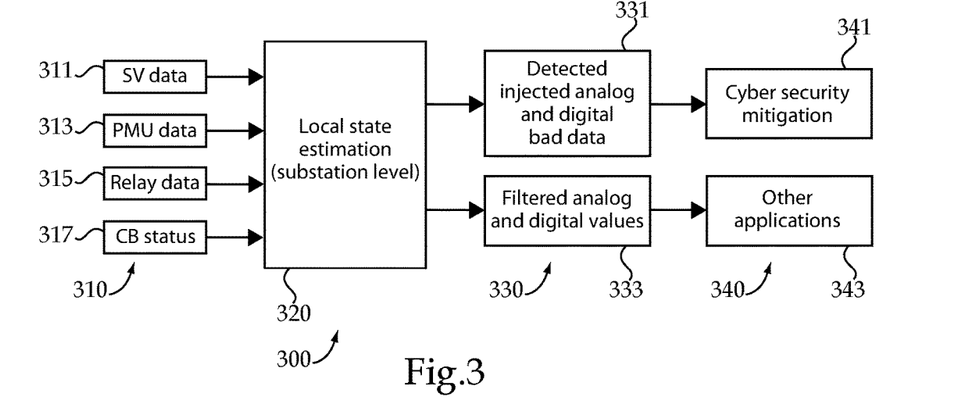
FIG. 3 is a schematic block diagram illustrating an exemplary substation phasor data concentrator.

With reference to FIG. 3 there is a block diagram illustrating an exemplary data collection system 300 such as data collection systems 100 and 200 of FIGS. 1 and 2, respectively. System 300 includes a local state estimation module 320 structured to receive a plurality of inputs 310. The plurality of inputs 310 include phasor data derived from sampled value data 311, PMU data 313, relay operational data 315, and circuit breaker status data 317.

State estimation module 320 is structured to estimate the electrical characteristics of a substation, such as substation 110 and substation 120. Module 320 outputs the estimated state to a plurality of analysis modules 330. Module 331 analyzes the output of the state estimation module, to determine whether false data was received with the ssPDC. When false data is identified, mitigation module 341 is configured to eliminate the data and replace the removed data with measurements from another substation device. Module 341 repeats the state estimation of module 320 until all the false data is successfully removed. When false data is not identified, module 333 identifies filtered measurements of module 320. Module 343 transmits the filtered measurements to external applications, such as a SCADA system or central PDC.

Figure 4:
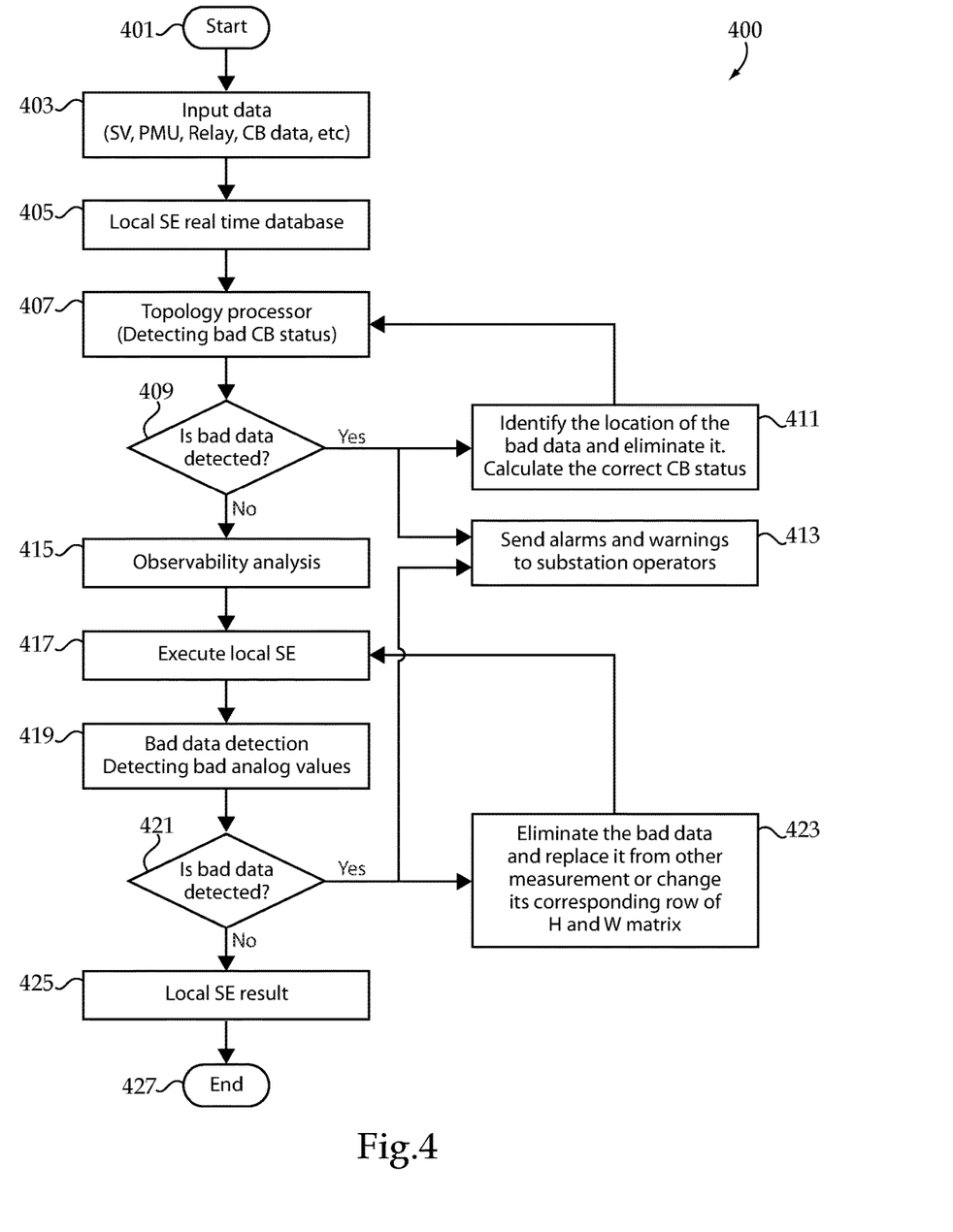
FIG. 4 is a flowchart illustrating an exemplary process for detecting and replacing false data.

With reference to FIG. 4, there is illustrated an exemplary process 400 for identifying and responding to false sampled value measurements, phasor data, or circuit breaker status data received with a substation phasor data concentrator, such as ssPDC 131 of FIG. 1. The following description of process 400 is made with reference to electrical substation data collection system 100 illustrated in FIG. 1. It is to be understood, however, that process 400 may be used in combination with other forms of electrical substation data collection systems, such as those described above with reference to FIG. 2.

Process 400 begins at start operation 401 where a cyber intruder has already injected false data into data collection system 100. Process 400 proceeds to operation 403 where ssPDC 131 receives circuit breaker status data, relay operational data, and real-time phasor data calculated using phasor data from PMU 119 and phasor data from PMU 127 derived from SV data generated with merging unit 121. Process 400 proceeds to operation 405 where ssPDC 131 stores the received data. Process 400 then proceeds to operation 407 where ssPDC 131 evaluates the stored data in order to estimate circuit breaker 105 status. For example, the measured phasor values from PMU and SV data can be used to estimate circuit breaker status with the following logic statement:

$$\text{If } (I_{pmu} \neq I_{sv}) V(I_{pmu}=0) V(I_{sv}=0) \text{ then open}$$

If the current phasor values from SV and PMU data are not the same, the current phasor of PMU measurement is zero, or the current phasor measurement of SV is zero, then circuit breaker 105 is estimated to be open.

Process 400 proceeds to conditional 409 where the estimated circuit breaker status is compared to the received circuit breaker status data. If ssPDC 131 detects bad data, process 400 proceeds to operation 411 where the false circuit breaker data is removed from the memory of ssPDC 131. Process 400 then proceeds to operation 407 where circuit breaker status is estimated again. Process 400 then returns to conditional 409.

If ssPDC 131 does not detect false data, process 400 proceeds to operation 415 where ssPDC 131 performs observability analysis to confirm enough data has been received with ssPDC 131 to proceed with state estimation. For example, by applying the graph theory, observability of the system can be calculated using node incidence matrix H. The network is observable if and only if h has full rank, where h is obtained from H by deleting any column. In another example, the system is observable if all the nodal voltages are either measured or can be calculated from the measured ones using a spanning tree of the power system graph. Process 400 then proceeds to operation 417 where ssPDC 131 performs local state estimation. Pseudo measurements may be calculated using local measurements. For example, a pseudo measurement for a current and voltage measurement in a neighboring substation may be calculated using local current and voltage measurements, as well as line parameter data for the line connecting the local substation to the neighboring substation. In one embodiment, all data input at operation 403 is synchronized and linear state estimation will be used to analyze the PMU and SV data. In other embodiments, nonlinear state estimation will be used to analyze the PMU and SV data.

Process 400 proceeds to operation 419 where ssPDC 131 evaluates the stored data. False data may be detected using an algorithm such as Chi-square distribution, normalized residuals, or hypothesis testing identification, to name but a few examples. Process 400 proceeds to conditional 421. If false data is detected, process 400 proceeds to operation 423 where false data is removed from memory in ssPDC and replaced with another data set. For example, false data detected in PMU data will be replaced with SV data. Process proceeds to operation 417. If false data is not detected, process 400 proceeds to operation 425 where ssPDC 121 has finished analyzing the received data and confirms all false data has been removed. The filtered data can then be transmitted to a central phasor data concentrator or another external device. Process 400 proceeds to end operation 427.

It shall be further appreciated that a number of variations and modifications to process 400 are contemplated including, for example, the omission of one or more aspects of process 400, or the addition of further conditionals and operations and/or the reorganization or separation of operations and conditionals into separate processes.

Further written description of a number of exemplary embodiments shall now be provided. One embodiment is a method for detecting and compensating for a false data injection cyber-attack on an electrical substation including a merging unit (MU), a phasor measurement unit (PMU), and a substation phasor data concentrator (ssPDC), the method comprising operating the PMU to receive input from at least one of a current transformer of the electrical substation, a voltage transformer of the electrical substation and a circuit breaker of the electrical substation and to provide a PMU measurement output based upon the received input, the PMU measurement output including one of a PMU current phasor, a PMU voltage phasor, and a PMU circuit breaker status indication; operating the MU to receive input from the at least one of the current transformer of the electrical substation, the voltage transformer of the electrical substation and the circuit breaker of the electrical substation and to provide an MU measurement output based upon the received input, the MU measurement output including one of an MU current phasor, an MU voltage phasor, and an MU circuit breaker status indication; receiving with the ssPDC a first input indicated as the PMU measurement output and a second input indicated as the MU measurement output and storing the first input and the second input in respective non-transitory memory locations; performing an electrical state estimation for the substation using the stored first input and the stored second input; determining, with the ssPDC, that one of the stored first input and the stored second input comprises false data based upon a discrepancy between the state estimation and the one of the stored first input and the second stored input; and replacing, in the memory of the ssPDC, the one of the stored first input and the stored second input which comprises false data with the other of the stored first input and the stored second input.

In certain forms of the foregoing method, the ssPDC receives the MU measurement by way of communication protocol IEC 61850-90-5. In certain forms, the electrical substation includes a circuit breaker and the set of electrical characteristics includes a circuit breaker status. In certain forms, the false data includes an inaccurate circuit breaker status and replacing the false data includes replacing the inaccurate circuit breaker status using the received PMU measurement or MU measurement. In certain forms, the method comprises transmitting, with the ssPDC, an alarm in response to determining that one of the stored first input and the stored second input comprises false data. In certain forms, state estimation includes one of Chi-square distribution, normalized residuals, and hypothesis testing identification. In certain forms, determining, with the ssPDC, that one of the stored first input and the stored second input comprises false data includes using historical MU measurements or PMU measurements.

Another exemplary embodiment is a substation phasor data concentrator (ssPDC) for an electrical substation comprising a phasor measurement unit (PMU) input structured to receive a PMU measurement from a PMU, the PMU measurement including a circuit breaker status and a phasor corresponding to a set of substation electrical characteristics; a merging unit (MU) input structured to receive an MU measurement from an MU including a phasor corresponding to the set of substation electrical characteristics; a non-transitory memory device structured to store the PMU measurement, the MU measurement, and a set of instructions; and a processing device structured to execute the set of instructions stored with the memory device configured to receive with the MU input a first measurement indicated as the MU measurement and; receive with the PMU input a second measurement indicated as the PMU measurement; estimate a circuit breaker status using the first and second measurement; determine the estimated circuit breaker status does not correspond to the circuit breaker status of the PMU measurement; replace the circuit breaker status of the PMU measurement with the estimated circuit breaker status; estimate the set of substation electrical characteristics using PMU measurement and the MU measurement, determine the first measurement or second measurement includes a false measurement which does not correspond to the set of electrical characteristics using the estimated set of substation electrical characteristics, and replace the false measurement with one of the MU measurement and the PMU measurement.

In certain forms of the foregoing ssPDC, the set of electrical characteristics include voltage and current. In certain forms, the PMU measurement and the MU measurement are time synchronized. In certain forms, the MU input receives the MU measurement by way of a phasor measurement unit structured to receive data from the merging unit, convert the data into a phasor measurement, and transmit the phasor measurement to the MU input. In certain forms, the MU input receives the MU measurement and the PMU input receives the PMU measurement by way of a wireless communication channel. In certain forms, the ssPDC comprises a protective relay input structured to receive a circuit breaker status from a protective relay. In certain forms, the processing device repeatedly estimates the set of substation electrical characteristics using the data received from the PMU input and the MU input until the processing device determines the first measurement and second measurement do not include a false measurement. In certain forms, the MU measurement is received with the ssPDC by way of an IEC 61850-90-5 communication protocol or an IEC 61850-9-2 communication protocol, and the PMU measurement is received with the ssPDC by way of a C37.118 communication protocol.

A further exemplary embodiment is a method for detecting and eliminating false data collected within an electrical substation including a first measurement unit, a second measurement unit, and a substation phasor data concentrator (ssPDC), comprising receiving, with the first measurement unit, a set of line information from a current transformer and a voltage transformer corresponding electrical characteristics of the electrical substation; generating, with the first measurement unit, a first phasor measurement using the set of line information; receiving, with the second measurement unit, the set of line information from the current transformer and the voltage transformer; generating, with the second measurement unit, a set of sampled values; converting the set of sampled values into a second phasor measurement; receiving, with the ssPDC, one of the first phasor measurement and the second phasor measurement; receiving, with the ssPDC, a set of false data which does not correspond to electrical characteristics of the electrical substation; determining, with the ssPDC, the set of false data does not correspond to the electrical characteristics of the electrical substation using local state estimation; and replacing the set of false data using the one of the first phasor measurement and the second phasor measurement received with the ssPDC.

In certain forms of the foregoing method, the set of false data and electrical characteristics include the status of a circuit breaker and determining the set of false data does not correspond to electrical characteristics of the electrical substation using local state estimation includes estimating the status of the circuit breaker and comparing the estimated status with the set of false data. In certain forms, the set of sampled values are IEC 61850-9-2 sampled values. In certain forms, the sampled values are transmitted to one of a protective relay and a phasor measurement unit, converted to the second phasor measurement, and transmitted to the ssPDC. In certain forms, the second phasor measurement is transmitted to the ssPDC by way of an C37.118 communication protocol, a manufacturing message specification communication protocol, or a distributed network protocol.

It is contemplated that the various aspects, features, processes, and operations from the various embodiments may be used in any of the other embodiments unless expressly stated to the contrary. Certain operations illustrated may be implemented by a computer executing a computer program product on a non-transient computer readable storage medium, where the computer program product includes instructions causing the computer to execute one or more of the operations, or to issue commands to other devices to execute one or more operations.

While the present disclosure has been illustrated and described in detail in the drawings and foregoing description, the same is to be considered as illustrative and not restrictive in character, it being understood that only certain exemplary embodiments have been shown and described and that all changes and modifications that come within the spirit of the present disclosure are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the present disclosure, the scope being defined by the claims that follow. In reading the claims, it is intended that when words such as "a," "an," "at least one," or "at least one portion" are used there is no intention to limit the claim to only one item unless specifically stated to the contrary in the claim. The term "of" may connote an association with or a connection to another item as well as a belonging to or a connection with the other item as informed by the context in which it is used. The terms "coupled to," "coupled with" and the like include indirect connection and coupling and further include but do not require a direct coupling or connection unless expressly indicated to the contrary. When the language "at least a portion" and/or "a portion" is used the item can include a portion and/or the entire item unless specifically stated to the contrary.

What is claimed is:

1. A method for detecting and compensating for a false data injection cyber-attack on an electrical substation including a merging unit (MU), a phasor measurement unit (PMU), and a substation phasor data concentrator (ssPDC), the method comprising:
    operating the PMU to receive input from at least one of a current transformer of the electrical substation, a voltage transformer of the electrical substation and a circuit breaker of the electrical substation and to provide a PMU measurement output based upon the received input, the PMU measurement output including one of a PMU current phasor, a PMU voltage phasor, and a PMU circuit breaker status indication;
    operating the MU to receive input from the at least one of the current transformer of the electrical substation, the voltage transformer of the electrical substation and the circuit breaker of the electrical substation and to provide an MU measurement output based upon the received input, the MU measurement output including one of an MU current phasor, an MU voltage phasor, and an MU circuit breaker status indication;
    receiving with the ssPDC a first input indicated as the PMU measurement output and a second input indicated as the MU measurement output and storing the first input and the second input in respective non-transitory memory locations;
    performing an electrical state estimation for the substation using the stored first input and the stored second input;
    determining, with the ssPDC, that one of the stored first input and the stored second input comprises false data based upon a discrepancy between the state estimation and the one of the stored first input and the second stored input; and
    replacing, in the memory of the ssPDC, the one of the stored first input and the stored second input which comprises false data with the other of the stored first input and the stored second input.

2. The method of claim 1 wherein the ssPDC receives the MU measurement by way of communication protocol IEC 61850-90-5.

3. The method of claim 1 wherein the electrical substation includes a circuit breaker and the set of electrical characteristics includes a circuit breaker status.

4. The method of claim 3 wherein the false data includes an inaccurate circuit breaker status and replacing the false data includes replacing the inaccurate circuit breaker status using the received PMU measurement or MU measurement.

5. The method of claim 1 comprising transmitting, with the ssPDC, an alarm in response to determining that one of the stored first input and the stored second input comprises false data.

6. The method of claim 1 wherein state estimation includes one of Chi-square distribution, normalized residuals, and hypothesis testing identification.

7. The method of claim 1 wherein determining, with the ssPDC, that one of the stored first input and the stored second input comprises false data includes using historical MU measurements or PMU measurements.

8. A substation phasor data concentrator (ssPDC) for an electrical substation comprising:
   a phasor measurement unit (PMU) input structured to receive a PMU measurement from a PMU, the PMU measurement including a circuit breaker status and a phasor corresponding to a set of sub station electrical characteristics;
   a merging unit (MU) input structured to receive an MU measurement from an MU including a phasor corresponding to the set of substation electrical characteristics;
   a non-transitory memory device structured to store the PMU measurement, the MU measurement, and a set of instructions; and
   a processing device structured to execute the set of instructions stored with the memory device configured to:
   receive with the MU input a first measurement indicated as the MU measurement and;
   receive with the PMU input a second measurement indicated as the PMU measurement;
   estimate a circuit breaker status using the first and second measurement;
   determine the estimated circuit breaker status does not correspond to the circuit breaker status of the PMU measurement;
   replace the circuit breaker status of the PMU measurement with the estimated circuit breaker status;
   estimate the set of substation electrical characteristics using PMU measurement and the MU measurement,
   determine the first measurement or second measurement includes a false measurement which does not correspond to the set of electrical characteristics using the estimated set of sub station electrical characteristics, and
      replace the false measurement with one of the MU measurement and the PMU measurement.

9. The ssPDC of claim 8 wherein the set of electrical characteristics include voltage and current.

10. The ssPDC of claim 8 wherein the PMU measurement and the MU measurement are time synchronized.

11. The ssPDC of claim 8 wherein the MU input receives the MU measurement by way of a phasor measurement unit structured to receive data from the merging unit, convert the data into a phasor measurement, and transmit the phasor measurement to the MU input.

12. The ssPDC of claim 8 wherein the MU input receives the MU measurement and the PMU input receives the PMU measurement by way of a wireless communication channel.

13. The ssPDC of claim 8 wherein the ssPDC comprises a protective relay input structured to receive a circuit breaker status from a protective relay.

14. The ssPDC of claim 8 wherein the processing device repeatedly estimates the set of substation electrical characteristics using the data received from the PMU input and the MU input until the processing device determines the first measurement and second measurement do not include a false measurement.

15. The ssPDC of claim 8 wherein the MU measurement is received with the ssPDC by way of an IEC 61850-90-5 communication protocol or an IEC 61850-9-2 communication protocol, and the PMU measurement is received with the ssPDC by way of a C37.118 communication protocol.

16. A method for detecting and eliminating false data collected within an electrical substation including a first measurement unit, a second measurement unit, and a substation phasor data concentrator (ssPDC), comprising:
   receiving, with the first measurement unit, a set of line information from a current transformer and a voltage transformer corresponding electrical characteristics of the electrical sub station;
   generating, with the first measurement unit, a first phasor measurement using the set of line information;
   receiving, with the second measurement unit, the set of line information from the current transformer and the voltage transformer;
   generating, with the second measurement unit, a set of sampled values;
   converting the set of sampled values into a second phasor measurement;
   receiving, with the ssPDC, one of the first phasor measurement and the second phasor measurement;
   receiving, with the ssPDC, a set of false data which does not correspond to electrical characteristics of the electrical substation;
   determining, with the ssPDC, the set of false data does not correspond to the electrical characteristics of the electrical substation using local state estimation; and
   replacing the set of false data using the one of the first phasor measurement and the second phasor measurement received with the ssPDC.

17. The method of claim 16 wherein the set of false data and electrical characteristics include the status of a circuit breaker and determining the set of false data does not correspond to electrical characteristics of the electrical substation using local state estimation includes estimating the status of the circuit breaker and comparing the estimated status with the set of false data.

18. The method of claim 16 wherein the set of sampled values are IEC 61850-9-2 sampled values.

19. The method of claim 18 wherein the sampled values are transmitted to one of a protective relay and a phasor measurement unit, converted to the second phasor measurement, and transmitted to the ssPDC.

20. The method of claim 19 wherein the second phasor measurement is transmitted to the ssPDC by way of an C37.118 communication protocol, a manufacturing message specification communication protocol, or a distributed network protocol.

* * * * *